June 23, 1964 L. V. VILLANI 3,137,955
LICENSE HOLDING BUMPER CONSTRUCTION
Filed Nov. 15, 1962
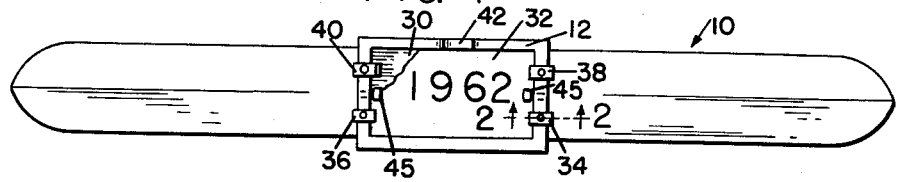
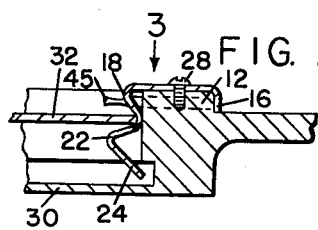
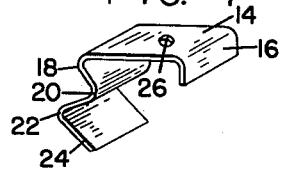
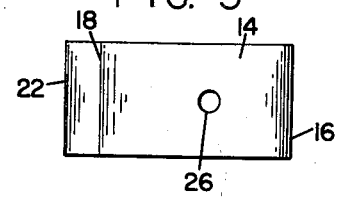
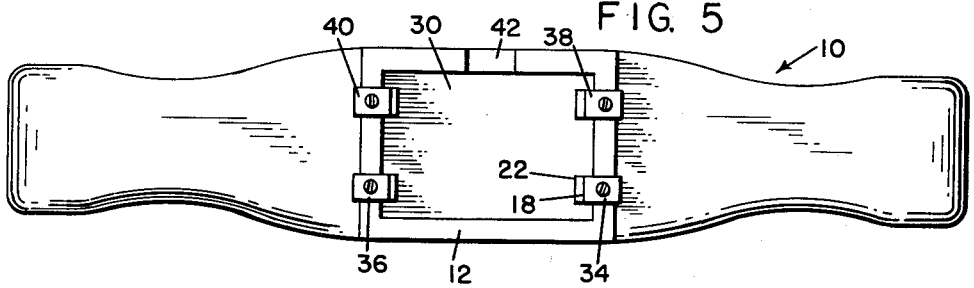
INVENTOR
LAZZARO V. VILLANI
BY *Chas. R. Jay*
ATTORNEY

United States Patent Office 3,137,955
Patented June 23, 1964

3,137,955
LICENSE HOLDING BUMPER CONSTRUCTION
Lazzaro V. Villani, 26 Leonard St., Milford, Mass.
Filed Nov. 15, 1962, Ser. No. 237,967
3 Claims. (Cl. 40—209)

This invention relates to a new and improved automobile vehicle bumper including new and improved means for holding a license plate therein in a position to be quickly and easily removed and replaced by a new license plate.

The principal object of the invention includes the provision of a vehicle bumper having formed therein a kind of rectangular frame in which the license plate is adapted to be mounted and including a series of spring clips removably fastened on the edge of said frame so as to firmly hold the license plate therein while providing for easy removal thereof.

A further object of the invention includes the provision of a license plate holding clip made of resilient metal and having means for securing it to the frame for the license, said clip having a configuration for receiving the edges of the license plate merely by snapping the same thereinto, said frame also including a cut out portion for the insertion of a screwdriver or the like simple tool for the purpose of removing the license plate quickly and easily.

Other objects and advantages of the invention will appear hereinafter.

Reference is to be had to the accompanying drawings, in which:

FIGS. 1 and 5 are views in front elevation illustrating the new license plate holder;

FIG. 2 is an enlarged section on line 2—2 of FIG. 1;

FIG. 3 is a plan view of one of the clips, and

FIG. 4 is a perspective view thereof.

Any kind of vehicle bumper 10 may be utilized. The construction of the bumper is of no importance except insofar as the license holding arrangement is concerned. This license plate holding arrangement includes generally centrally of the bumper a rectangular framework 12 which comprises outstanding projections or the like forming a frame. Depending upon the width of the bumper will depend whether the frame 12 extends above and below the top and bottom edges of the bumper or not.

In any event, this frame is adapted to be approximately to the size and shape of the usual license plate and provides an outstanding rim upon which the spring clips to be described are adapted to be mounted.

These clips are shown in FIGS. 2, 3 and 4 and each one comprises a flat body portion 14, a downturned tail 16 at the rear portion thereof, the front portion extending downwardly and reversely inwardly (see for instance 18) to a point 20, the limit of the inward projection of this part of the device. From there the clip extends forwardly on an incline to a point 22 and then has a front tail extending to the rear as at 24. The plate 14 has an aperture 26 therein for the reception of a fastener 28 to secure the clip to the bumper if necessary.

The area inside of the frame 12 is solid as at 30 (see the license plate FIG. 1 at 32), the same being broken away to illustrate this construction.

A series of the clips being set upon the rim 12 preferably in the relative positions shown in FIG. 1, the license plate need only be snapped down into the clips past the bulges at 18 and come to rest on the joint shelf which is formed by the several clips between the points at 22 and the points at 18. It will be seen that the license plate is slightly longer than the effective distance between the points 18 between two pairs of clips which are illustrated in FIG. 1, as at 34 and 36, and the same is true as to the other clips 38 and 40. Thus the license plate is firmly held in the frame and is not liable to accidental removal but can be removed by inserting a tool in the notch at 42 so as to get the point of the tool behind the license plate and snap it out, and a new license plate can be snapped back in very easily.

A pair of thumbscrews 45 may be threaded into the frame in the lateral or side portions thereof so that the heads of these thumbscrews overlie the license plate and act as a positive holder therefor in addition to the resilient holding which is done by the spring clips.

Having thus described my invention and the advantages thereof, I do not wish to be limited to the details herein disclosed, otherwise than as set forth in the claims, but what I claim is:

1. A bumper construction including means for holding a license plate thereto, said means comprising a continuous open raised frame on the bumper and a set of separate spring clips mounted on said raised frame in opposed pairs, each clip comprising a springy member having a flat intermediate portion overlying a part of the frame, a tail member extending outwardly relative to the frame, said clip extending inwardly with respect to the frame and downwardly and slightly reversely to form a projection past which the license plate must be snapped, said clip then extending inwardly forming a shoulder to underlie the license plate at its edge, and means for securing the clip in position on the frame.

2. The bumper construction and license plate holder of claim 1 wherein the area inside the frame is solid and including a notch in the frame for the entrance of a tool by which to pry the license plate up past the projections formed by the separate clips.

3. A bumper mounted license plate holder comprising an open rectangular frame on and extending forwardly from the bumper, said frame being capable of receiving a license plate therein, a series of spring clips mounted on the frame and extending thereinto, each clip including a projection extending into the area of the frame, the projections reducing the effective width of the frame to a degree to provide that certain edges of the license plate must snap past the projections to be received in the frame, said projections then holding the license plate in position, said clips including means spaced from each projection forming a channel in each projection, said channels opening toward the center of the rectangular frame and the edges of the license plate being received and held in said channels.

References Cited in the file of this patent
UNITED STATES PATENTS
1,059,764    Ringer _____ Apr. 22, 1913

FOREIGN PATENTS
749,646    France _____ May 8, 1933
812,030    Germany _____ Aug. 27, 1951